United States Patent Office.

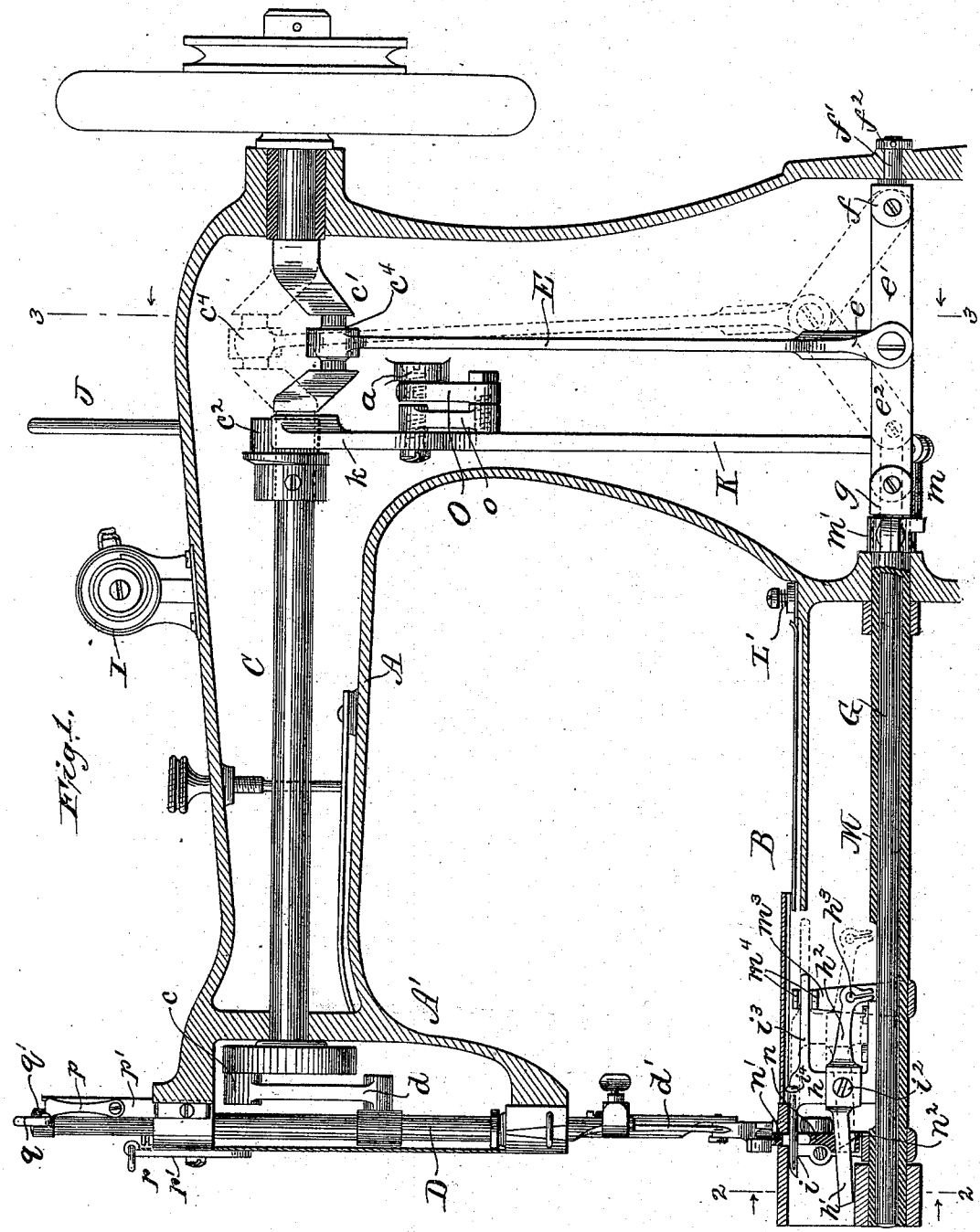

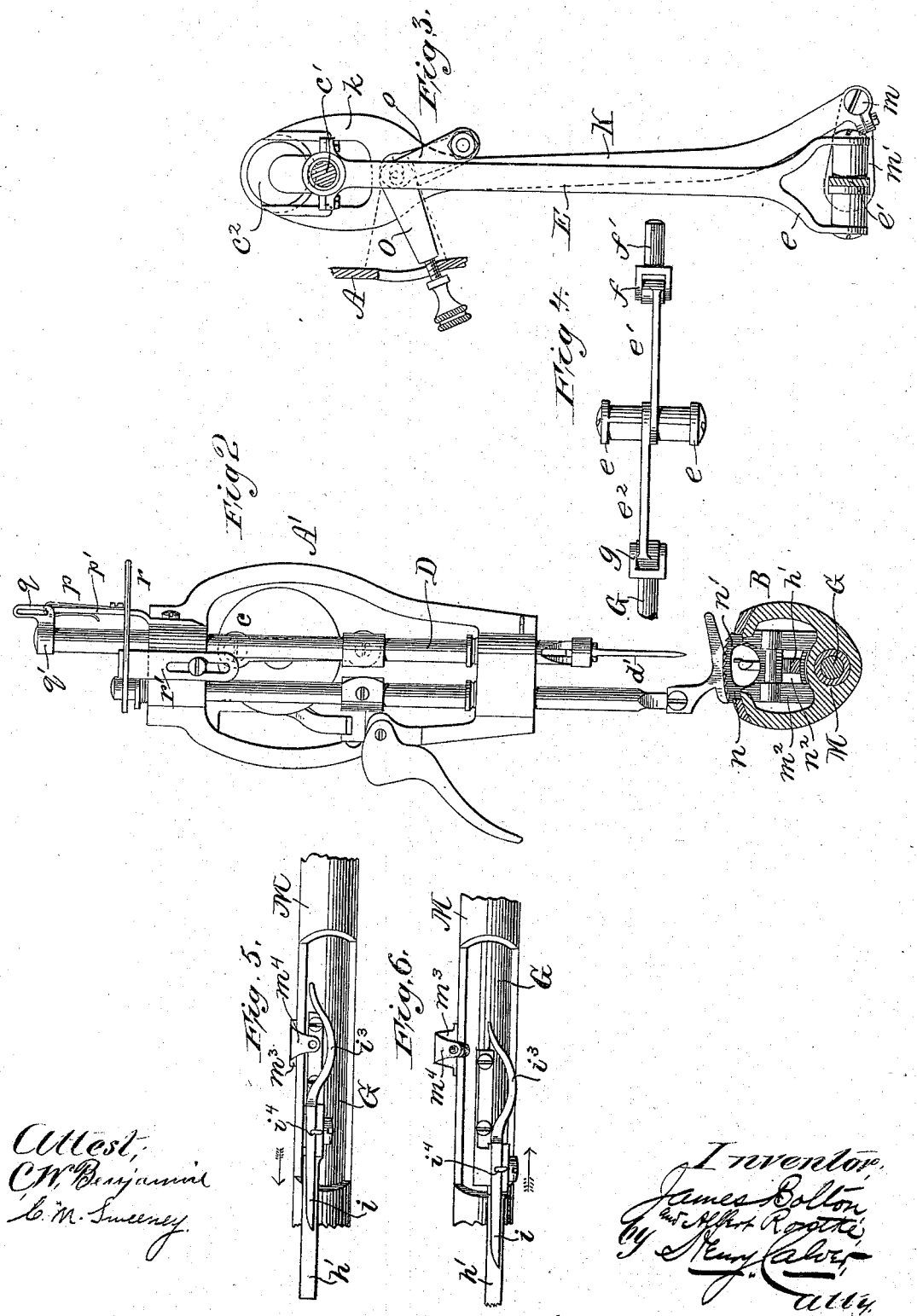

JAMES BOLTON AND ALBERT RONTKE, OF CHICAGO, ILLINOIS, ASSIGNORS TO THE SINGER MANUFACTURING COMPANY, OF NEW JERSEY.

SEWING-MACHINE.

SPECIFICATION forming part of Letters Patent No. 552,509, dated January 7, 1896.

Application filed February 17, 1894. Serial No. 500,484. (No model.)

*To all whom it may concern:*

Be it known that we, JAMES BOLTON and ALBERT RONTKE, citizens of the United States, residing at Chicago, in the county of Cook and State of Illinois, have invented certain new and useful Improvements in Double-Chain-Stitch Sewing-Machines, of which the following is a specification, reference being had therein to the accompanying drawings.

Our invention has for its object to provide a sewing-machine for making the double-chain or "Grover & Baker" stitch, said machine being simple in construction and strong and positive in operation, so as to be capable of being run at high speeds, and being provided with means whereby the upper and lower threads will at all times be properly controlled.

In the drawings, Figure 1 is a sectional side view of a sewing-machine embodying our invention. Fig. 2 is a front end view of the same, partly in section, on line 2 2, Fig. 2. Fig. 3 is a sectional view on line 3 3, Fig. 1, the framework or arm of the machine being mostly omitted. Fig. 4 is a detail view of the toggle for operating the looper-carrying bar. Figs. 5 and 6 are detail plan views, with the parts in different positions, of a portion of the mechanism in the forward part of the work-supporting arm or cylinder.

A denotes the bracket-arm and B the work-support, herein shown as being in the form of an arm or cylinder to adapt the machine for use in sewing tubular or hollow articles. Journaled in the upper part of the bracket-arm A is the main or driving shaft C having at its forward end a crank $c$ connected by a pitman $d$ with the needle-bar D, said shaft having near its rear end the crank $c'$, to which is connected a pitman E forked at its lower end to form the yoke $e$, and to which latter is jointed the central part of a toggle consisting of the links $e'$ and $e^2$. The link $e'$ is jointed at its rear end to a yoke $f$ of a stud $f'$ fitted to rock in a suitable bearing in the frame of the machine, but held from endwise movement, as by a collar $f^2$ fixed to said stud outside of its bearing. The link $e^2$ is jointed at its forward end to a yoke $g$ of a sliding and rocking looper-operating bar G, having near its forward end a vertical arm $h$ carrying the eyed or thread-carrying looper $i$, the latter being herein shown as integral with the arm $h$ and with a curved thread-controlling arm $i^3$. To the arm $h$ is attached by a screw $i^2$ a bar consisting of the inclined forwardly-extending feed lifting and lowering arm $h'$ and the rearwardly-extending arm $h^2$ having a slotted thread-eye $h^3$.

From the above-described construction of the connections of the crank $c'$ with bar G it results that the vertical throw of said crank will cause the toggle formed by the links $e'$ and $e^2$ to be alternately straightened out and bent, and as the rear connection of said toggle is a fixed one the forward end thereof will move horizontally, thus imparting a longitudinal sliding movement to the bar G. A ball-joint at $c^4$, between the crank $c'$ and the upper end of the pitman E, permits the lower end of said pitman to vibrate slightly longitudinally of the machine without causing binding of the parts at the connection of said crank and pitman. The lateral throw of the crank $c'$ is imparted to the bar G through the yokes $e$ and $g$ and toggle-link $e^2$, thus imparting rocking movements to said bar to move the looper laterally to cause it to pass forward on one side of the needle and backward on the other side thereof.

The driving-shaft C is provided adjacent to the crank $c'$ with an eccentric $c^2$ embraced by a yoke $k$ at the upper end of a connecting-bar K jointed at its lower end to a stud $m$ carried by a crank-arm $m'$ of a rocking feed-shaft M, within which, in the form of our invention herein shown, slides and rocks the looper-operating bar G, said feed-shaft M having near its forward end an upwardly-projecting arm $m^2$ grooved or recessed to receive the block $n$ provided with the serrated feed-dog or surface $n'$, said block having a slot $n^2$, in which works the inclined arm $h'$ on the looper-carrying arm or projection $h$ to cause the block $n$ to be raised and lowered in the arm $m^2$, the rocking movements of the shaft M imparting forward and backward movements to the feed-block, as will readily be understood. The rocking movements of the shaft M to regulate the feed are varied by the feed-adjusting bell-crank lever O, pivoted to a lug $a$ in the bracket-arm A, said lever O being connected with the bar K by the link o. This feed-regulating feature is not of our invention, being shown by United States Patent No. 229,629, dated July 6, 1880, to Miller and Diehl.

The feed rock-shaft M is provided with a thread-controlling arm $m^3$ having perforated lugs $m^4$ through which the looper-thread is passed and in a line between which lugs extends the thread-controlling arm $i^3$ moving with the sliding and rocking looper-operating bar G. As the parts are so timed that the rocking movements of the bar G and shaft M are in opposition to each other, a bight or loop of thread passing through the thread-eye in one of the lugs $m^4$, partly around the arm $i^3$, and then through the thread-eye in the other of the lugs $m^4$ (on its way to the thread-eye $h^3$ and thence, through the eye or guide $i^4$, to the looper $i$) will be enlarged to take up the slack and tighten the stitch as said arms $m^3$ and $i^3$ recede from each other in their opposite rocking movements, this action occurring when the looper is moving backward after its loop has been taken by the needle, and the take-up action of the backwardly-moving arm $i^3$ being increased by its horizontal curvature away from the arm $m^3$, the thread being engaged by the convex surface of said arm. From the fact that the take-up action of the thread-controlling arm $m^3$, moving with the rocking feed-shaft M, is in proportion to the length of the stitches, resulting from the length of feed, it will be apparent that the take-up for the lower thread, movable with the feed, is an important novel feature of our machine.

The needle-thread running from the spool on the spool-pin J through the tension device I to the needle $d'$ passes through a controlling device consisting, as herein shown, of a light spring $p$ attached to the bar $p'$ secured to the head A' of the machine, and a slotted eye $q$ carried by a collar $q'$ attached to the upper end of the needle-bar D, the thread running over a guide-rod $r$, the shank or support $r'$ of which is also secured to the said head A'. When the needle-bar and needle rise the thread is lifted by the lower wall of the slot of the eye $q$ so as to be brought beneath the spring $p$, and thus when said needle again descends the slack thread will be held up until the eye of the needle has reached the work, when the upper wall of said slot will engage the thread and draw it downward free from the spring $p$, leaving it properly slack for the formation of the loop. The lower thread, on its way to the looper $i$, passes through a tension device L'.

In the operation of our machine the needle descends, and as it rises and throws out a loop the latter is taken by the looper which advances on one side of the needle and retreats, when the needle is again descending, on the other side of the needle, thus carrying its thread around the needle, so that the latter at each descent enters a loop of needle-thread, and thus the needle and looper threads are alternately interlooped, making double-chain stitches.

It will thus be seen that by the construction and arrangement of the parts herein shown and described we are enabled to impart sliding and rocking movements to the looper-carrying bar, which is beneath the work-plate, from a rotating shaft located in the upper part of the arm of the machine, and it will also be seen that we utilize the rocking movements of the feed-shaft and looper-carrying bar, as also the longitudinal movements of the latter, in controlling or taking up the slack of the looper-thread, thereby providing an efficiently-operating machine consisting of comparatively few parts; and as the feeding and looper movements are all positive the machine is well adapted for high speed.

We do not wish to be understood as limiting our invention to the details herein shown, as such details may be varied widely without departing from the essential principles of our invention.

Having thus described our invention, we claim and desire to secure by Letters Patent—

1. In a double-chain stitch sewing machine, the combination with a rotating driving shaft provided with a crank, of a thread-carrying looper, a bar for operating the same, a toggle to impart longitudinal or sliding movements to said bar, a pitman connecting said toggle to said crank so as to cause the toggle to rock and thus impart lateral movements to the said looper in addition to its longitudinal movements, and a needle-bar and needle also operated from said shaft.

2. In a double-chain stitch sewing machine, the combination with a rotating driving shaft journaled in the upper part of the arm thereof and provided near its rear end with a crank, of a needle bar operatively connected to the forward end of said shaft, a bar placed below the work-plate of the machine and having at its forward portion a thread-carrying looper, a toggle, one end of which is fixed and the other end of which is connected to the rear end of said bar, and a pitman connecting said crank to said toggle to cause sliding or longitudinal and rocking movements to be imparted to said looper-carrying bar.

3. In a double-chain stitch sewing machine, the rotating driving shaft C journaled in the upper part of the arm thereof and provided near its rear end with the crank $c'$, and the needle-bar operatively connected to the forward end of said shaft, of the pitman E connected at its upper end to said crank and provided at its lower end with the yoke, the toggle links $e'$ and $e^2$ connected to said yoke, one end of said link $e'$ being fixed to the frame work of the machine, the sliding and rocking bar G to the rear end of which the forward end of the toggle link $e^2$ is jointed and the looper $i$ carried by said bar.

4. In a double chain stitch sewing machine, the combination with a needle bar and needle and a longitudinally and laterally movable thread-carrying looper, of a thread-controlling arm laterally movable with said looper, a rocking feed shaft provided with a thread controlling arm, and operating mechanism for said parts whereby said needle-bar is actuated and whereby also rocking or lateral movements, in opposition to each other, are imparted to said thread-controlling arms.

5. In a double-chain stitch sewing machine, the combination with the rocking and sliding bar G, of the arm $h$, the looper $i$ carried by said arm and which latter is also provided with the thread-controlling arm $i^3$, the rocking feed shaft M provided with the thread-controlling arm $m^3$, and operating mechanism whereby rocking movements, in opposite directions, are imparted to said bar and shaft and whereby also said bar is reciprocated longitudinally.

6. In a double chain stitch sewing machine, the combination with the rocking and sliding bar G having the arm $h$, of the looper $i$ carried by said arm, the latter being provided with the horizontally curved thread controlling arm $i^3$, the rocking feed-shaft M having the thread controlling arm $m^3$ provided with the lugs $m^4$ perforated to form thread eyes, and operating mechanism whereby rocking movements, in opposite directions, are imparted to said bar and shaft and whereby also said bar is reciprocated longitudinally.

7. In a double-chain stitch sewing machine, the combination with a rocking feed shaft, having an arm, and a feeding device movable horizontally with said arm but fitted to move vertically independently thereof, of a sliding and rocking looper-carrying bar provided with an inclined arm to engage said feeding device and impart vertical movements thereto, and operating mechanism for said feed shaft and looper bar.

8. In a double-chain stitch sewing machine, the combination with a thread carrying looper and a feeding device, of a lower-thread take-up device movable with the feed and thus serving to take up an amount of slack thread in proportion to the length of the stitches being formed.

In testimony whereof we affix our signatures in presence of two witnesses.

JAMES BOLTON.
ALBERT RONTKE.

Witnesses to signature of Jas. Bolton:
CAROLINE SIMRALL,
L. MORETON MURRAY.

Witnesses to signature of Albert Rontke:
J. F. JAQUITH,
HENRY CALVER.